United States Patent

Bilancia

[15] 3,642,322
[45] Feb. 15, 1972

[54] SEAT WITH DECORATIVE COVER ASSEMBLY

[72] Inventor: Raymond A. Bilancia, Palatine, Ill.
[73] Assignee: Coach and Car Equipment Corporation, Elk Grove Village, Ill.
[22] Filed: July 9, 1969
[21] Appl. No.: 840,189

[52] U.S. Cl..............................297/445, 297/183, 297/444, 297/452
[51] Int. Cl.....................A47c 1/12, A47c 4/52, A47c 31/00
[58] Field of Search..................297/445, 452, 353, 440, 453, 297/218, 183, 232, DIG. 1; 248/188, 188.1, 188.8, 345.1; 108/156

[56] References Cited

UNITED STATES PATENTS

| | | | |
|---|---|---|---|
| 1,695,101 | 12/1928 | Hoffman | 297/444 X |
| 1,899,040 | 2/1933 | Koken | 297/183 X |
| 2,252,970 | 8/1941 | Gedris | 297/450 X |
| 2,440,470 | 4/1948 | Greitzer | 297/444 |
| 3,173,723 | 3/1965 | Houen et al. | 297/452 X |
| 3,288,529 | 11/1966 | Koch | 297/444 X |
| 2,321,204 | 6/1943 | Hillenbrand | 248/188.8 |
| 2,417,961 | 3/1947 | Wiley | 248/345.1 |
| 2,564,924 | 8/1951 | Patton | 297/183 |
| 2,833,339 | 5/1958 | Liljengren | 297/DIG. 1 UX |
| 3,145,050 | 8/1964 | Edwards | 297/183 |
| 3,336,078 | 8/1967 | Haley | 297/232 |
| 3,350,133 | 10/1967 | Schaefer | 297/452 X |

*Primary Examiner*—Paul R. Gilliam
*Attorney*—Merriam, Marshall, Shapiro & Klose

[57] ABSTRACT

A seat for mass transportation vehicles and a decorative cover assembly for the rear of the seat back and for the seat pedestal. The cover assembly eliminates or hides from view unsightly components or projections and prevents wearing or tearing of clothing or chafing of skin when a passenger brushes against a seat.

9 Claims, 9 Drawing Figures

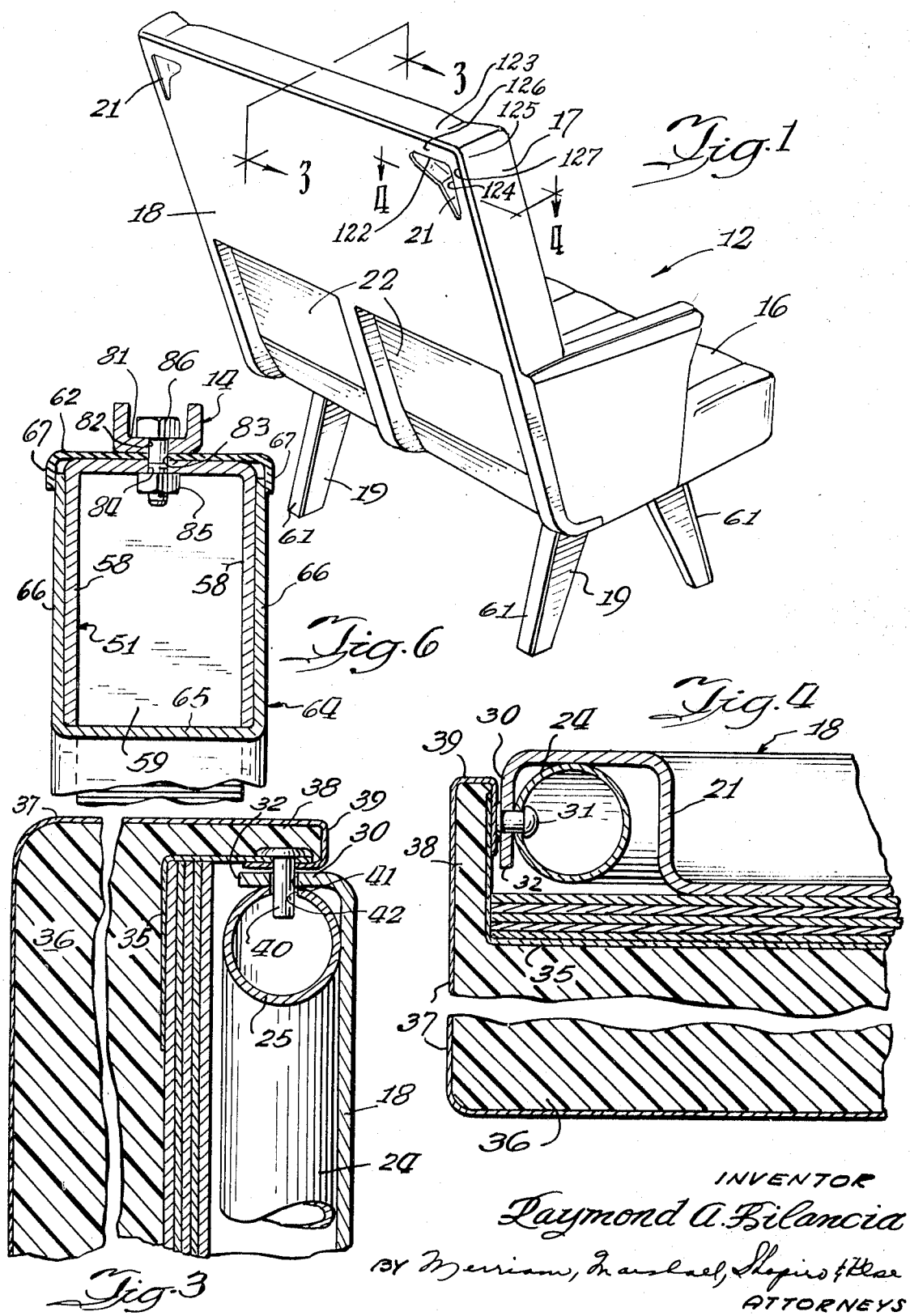

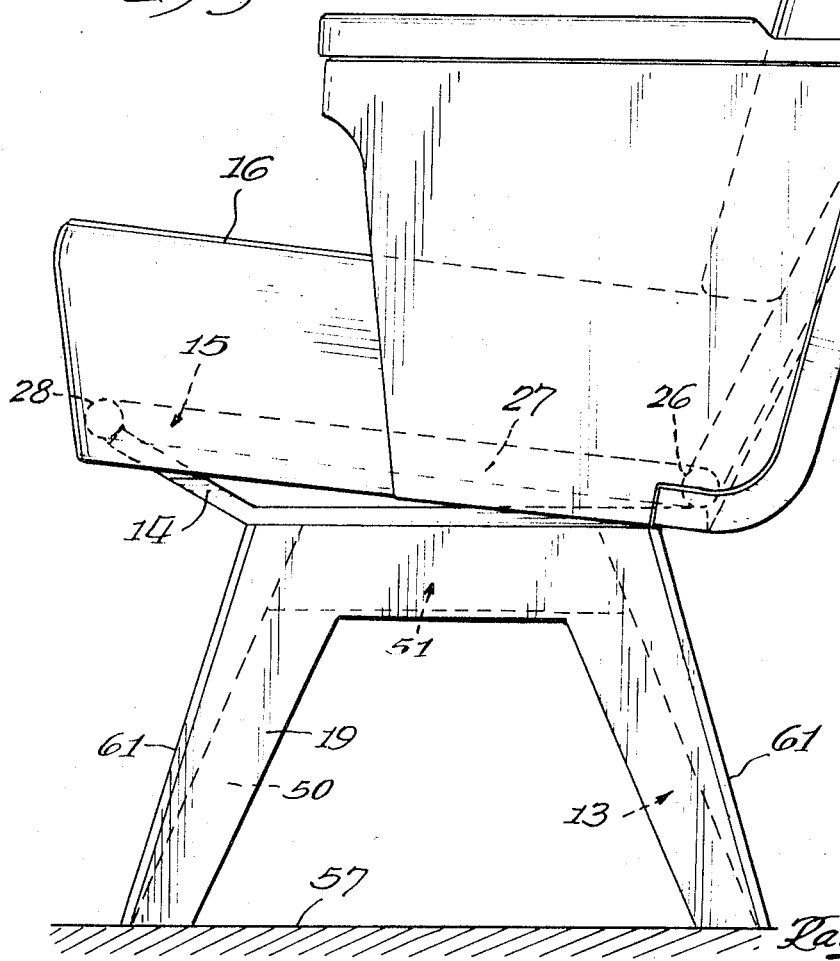

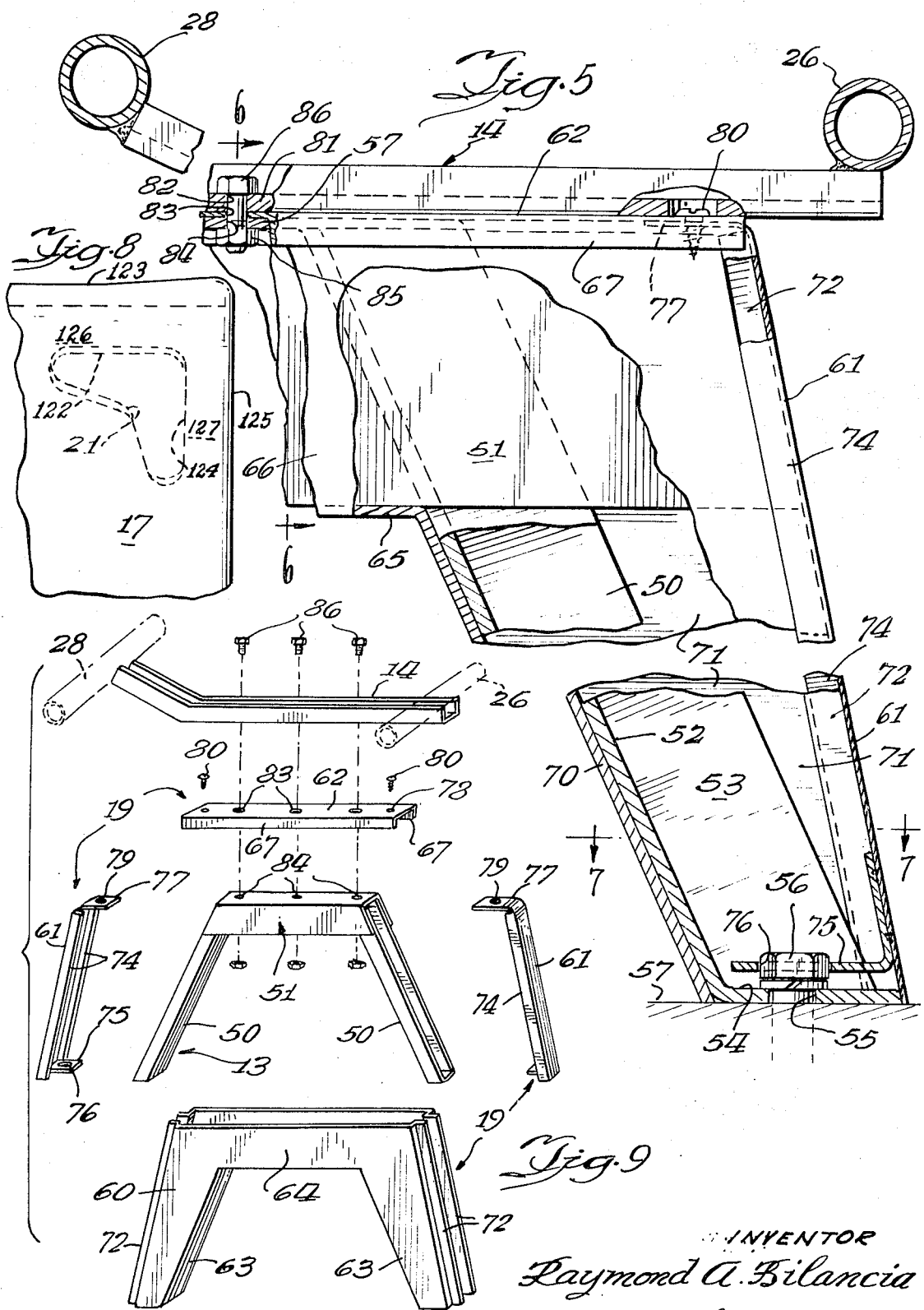

3,642,322

SEAT WITH DECORATIVE COVER ASSEMBLY

BACKGROUND OF THE INVENTION

The present invention relates generally to seats useful in mass transportation vehicles such as commuter railway cars, rapid transit cars, buses and the like. More specifically, the present invention relates to a seat with a decorative cover assembly hiding from view all raw edges or unsightly structural framework.

Conventionally, seats for mass transportation vehicles are constructed so that raw panel edges, fasteners, and structural framework, principally associated with the rear of the seat back and the seat pedestal, and all relatively unsightly, are exposed to view; and these, together with grab bars or handles for standing passengers, are so located that they can be brushed against by passengers sitting down in or arising from the seats, causing wearing or perhaps tearing of the passengers' clothing and causing chafing of the passengers' skin should the skin rub against these projections or raw edges.

SUMMARY OF THE INVENTION

A seat constructed in accordance with the present invention includes a decorative cover assembly for the rear of the seat back and for the seat pedestal. This cover assembly eliminates or hides from view unsightly raw edges, fasteners, structural framework, projecting grab bars and the like and presents not only an aesthetically pleasing appearance, but, also, eliminates whatever wear or tearing of clothing or chafing of skin could occur from a brushing against these items by passengers sitting down or arising from the seats.

The components of the seat and of the decorative cover assembly are structurally related so as to facilitate ready assembly and disassembly of the seat and cover assembly components in cases where repair or maintenance work on any of them is desired.

Other features and advantages are inherent in the structure claimed and disclosed or will become apparent to those skilled in the art from the following detailed description in conjunction with the accompanying diagrammatic drawings.

BRIEF DESCRIPTION OF THE DRAWINGS

FIG. 1 is a perspective view of an embodiment of a seat with a decorative cover assembly in accordance with the present invention;

FIG. 2 is a side elevational view of the seat;

FIG. 3 is a sectional view taken along line 3—3 in FIG. 1;

FIG. 4 is a sectional view taken along line 4—4 in FIG. 1;

FIG. 5 is a fragmentary side elevational view, partially cut away and partially in section, showing a part of the seat pedestal and a part of the cover assembly for the pedestal;

FIG. 6 (sheet 1) is a sectional view taken along line 6—6 in FIG. 5;

FIG. 7 (sheet 2) is a sectional view taken along line 7—7 in FIG. 5;

FIG. 8 is a fragmentary front view of an upper corner of a seat back; and

FIG. 9 is an exploded perspective view of a seat pedestal and a cover assembly for the pedestal.

DESCRIPTION OF THE PREFERRED EMBODIMENTS

Referring initially to FIGS. 1 and 2, there is illustrated an embodiment of a seat with a decorative cover assembly constructed in accordance with the present invention. The seat, indicated generally at 12, includes a pedestal 13 (FIG. 2) enclosed within a pedestal cover assembly 19. Pedestal 13 supports a bracket 14 in turn supporting a seat frame 15 which supports a seat cushion 16 and a seat back 17. Attached to seat frame 15 is a rigid rear cover panel 18 including recessed handgrabs 21, adjacent the upper corners of the panel (FIG. 8), and a pair of lower recesses 22 each for accommodating the knees and lower legs of a passenger riding in a seat located behind rear cover panel 18.

As shown in FIGS. 1 and 8, each recess 21 has an upper sidewall 122 parallel to the closest portion 123 on the seat back top, and recess upper sidewall 122 and seat back top portion 123 together define a handle 126. Each recess also has an outer sidewall 124 parallel to the closest portion 125 of the seat back side, and recess outer sidewall 124 and seat back side portion 125 together also define a handle 127.

Referring now to FIGS. 2–5, seat frame 15 comprises a pair of spaced vertical back parts 24, 24, a top back part 25 extending between vertical parts 24, 24 at the top thereof, a bottom back part 26 extending between vertical parts 24, 24 at the bottom thereof, a pair of horizontally extending bottom side parts 27, 27 and a bottom front part 28 extending between bottom side parts 27, 27 at the front ends of the latter.

Referring to FIGS. 3 and 4, rear cover panel 18 includes a peripheral flange portion 30 located at the top and sides of panel 18 and extending frontwardly therefrom. Flange portion 30 is attached by rivets 31 to the spaced vertical parts 24, 24 and the top back part 25 of seat frame 15 (FIG. 4).

Seat back 17 comprises a rigid base member 35 covered with padding 36 in turn covered with a flexible covering material 37 such as plastic or leather. Seat back 17 includes a peripheral flange portion 38 extending rearwardly from the seat back and terminating at an edge 39 covered by fabric 37.

Referring to FIG. 3, depending downwardly from the top part of seat back flange portion 38 are a plurality of pins 40 for removably mounting seat back 17 on seat frame 15. Each pin 40 extends downwardly through a corresponding opening 41 in flange portion 30 of rear cover panel 18 and through an opening 42 in the seat frame's top back part 25. This arrangement facilitates emplacement and removal of the seat back for repair and servicing.

When the seat back is attached to the seat frame, as described in the preceding paragraph, peripheral flange portion 38 of the seat back overlies flange portion 30 of the rear cover panel and covers fasteners 31 attaching the rear cover panel to the seat frame. In addition, covered edge 39 on the seat back flange portion is located rearwardly of the raw edge 32 on rear panel flange portion 30. Raw edge 32 and fasteners 31 are hidden from view, and all that is visible is seat back 17 or parts thereof such as peripheral flange portion 38 and its covered edge 39.

Because raw edge 32 and rivets 31 are hidden from view, the overall appearance is much more pleasing, aesthetically, than would be the case if they were visible. Moreover, because raw edge 32 and fasteners 31 are covered, the possibility of rubbing against them, causing tearing or wearing of clothing or chafing of skin, is eliminated.

Referring to FIG. 9, pedestal 13 comprises a pair of upwardly converging leg members 50, 50 and a channel-shaped crossmember 51 extending between leg members 50, 50 at the top thereof.

As shown in FIGS. 7 and 9, each channel-shaped leg member 50 comprises a web 52 and a pair of flanges 53, 53 extending from web 52. Fixed to the bottom of leg member 50 is a baseplate 54 having an opening 55 for receiving the shank of a headed fastener 56 such as a bolt for fastening leg member 50 to a floor 57.

As seen in FIG. 6, crossmember 51 of pedestal 13 comprises a web 57 and flanges 58, 58 extending downwardly from web 57 and terminating at an open side 59 of channel-shaped crossmember 51.

From an appearance standpoint, exposure to view of pedestal 13 is undesirable. Accordingly, pedestal 13 is hidden from view by pedestal cover assembly 19 (FIG. 9) comprising a cover member 60 having a pair of leg portions 63, 63 and an upper portion 64, a pair of end plates 61, 61, and a top plate 62.

Referring to FIG. 6, upper portion 64 of cover member 60 includes a web 65 covering open side 59 of crossmember 51 of the pedestal. Extending upwardly from web 65 are a pair of flanges 66, 66 substantially covering the downwardly depending flanges 58, 58 of crossmember 51. Web 57 of crossmember 51 is covered by top plate 62 having a pair of downwardly depending marginal flanges 67, 67 each overlapping a respective upwardly extending flange 66, 66 on upper cover portion 64.

Extending downwardly from upper cover portion 64 of cover member 60 are the two leg portions 63. As shown in FIG. 7, each second or leg portion 63 includes a web 70 covering one side of web 52 of the pedestal leg member 50. Extending from web 70 are a pair of flanges 71, 71 each covering a respective flange 53, 53 of leg member 50.

Each flange 71 terminates at a respective indented marginal part 72, and the two marginal parts 72, 72 define an open side 73 of cover portion 63. This open side 73 is closed by end plate 61 of the pedestal cover assembly. End plate 61 has a pair of marginal flanges 74, 74 each received in a respective indented marginal part 72, 72 of cover assembly leg portion 63.

As shown in FIGS. 5 and 7, end plate 71 has a lower tab 75 attached to the inner side of the end plate and extending within channel-shaped pedestal leg member 50 adjacent baseplate 54 of the leg member. Tab 75 has an opening 76 for receiving the head of fastener 56 and for helping to maintain end plate 61 in place.

Referring to FIGS. 5 and 9, end plate 61 also includes an upper tab 77 located below top plate 62 and extending between the downwardly depending marginal flanges 67, 67 of the top plate. Located in top plate 62 and in upper tab 77 of end plate 61 are respective vertically aligned openings 78, 79 for receiving a fastener 80 (FIG. 9) for attaching end plate 61 to top plate 62.

Referring to FIGS. 5 and 9, bracket 14, which mounts seat frame 15 on pedestal 13, has a channel-shaped cross section and extends between bottom rear part 26 and bottom front part 28 of seat frame 15. Bracket 14 has a web or flat portion 81 resting atop top plate 62 of the pedestal cover assembly.

Web 81 of bracket 14 has a plurality of openings 82 each aligned with an opening 83 in top plate 62 of the pedestal cover assembly and each of these openings is in turn aligned with an opening 84 in the web 57 of pedestal crossmember 51. Bracket 14 is attached to pedestal 13 by threaded fasteners such as bolts 86 each extending through aligned openings 82, 83, 84 and held in place by a threaded nut 85 attached to the bottom of web 57 on crossmember 51.

The foregoing detailed description has been given for clearness of understanding only, and no unnecessary limitations should be understood therefrom, as modifications will be obvious to those skilled in the art.

What is claimed is:

1. In a seat:
a seat frame;
a rigid rear cover panel for said seat;
said rear cover panel having a flange portion extending frontwardly from said panel and attached to said seat frame;
said flange portion terminating at a raw edge;
a seat back mounted on said seat frame and located frontwardly of said rear cover panel;
and means on said seat back covering from view said raw edge of the flange portion;
said last-recited means comprising a peripheral flange portion on the seat back extending rearwardly from the seat back and terminating at a covered edge;
said peripheral flange portion of the seat back overlying the flange portion of the rear cover panel with said covered edge on the seat back located rearwardly of the raw edge on the rear cover panel so that the raw edge is inside relative to the seat back.

2. In a seat as recited in claim 1;
fasteners at said flange portion of the rear cover panel attaching the latter to said seat frame;
said peripheral flange portion of the seat back covering said fasteners.

3. In a seat as recited in claim 2:
said peripheral flange portion on the seat back having a top part for mounting on a top part of said seat frame;
a plurality of pins extending downwardly from said top part of the peripheral flange portion;
and aligned openings in the top part of the seat frame and the flange portion of the rear cover panel for removably receiving each of said pins.

4. In a seat:
a seat frame;
a pedestal for supporting said seat frame;
and an assembly for covering said pedestal;
said pedestal comprising an upwardly extending leg member having a web and a pair of flanges;
said cover assembly comprising an upwardly extending channel-shaped cover portion having a web covering one side of the web of said leg member and having flanges covering the flanges of the leg member;
each flange of said channel-shaped cover portion terminating at a respective indented marginal part defining an open side of the cover portion therebetween;
said cover assembly comprising an end plate for closing said open side of the channel-shaped cover portion;
said end plate having a pair of marginal flanges;
each of said indented marginal parts on the flanges of the channel-shaped cover portion comprising means for receiving a respective marginal flange on the end plate.

5. In a seat as recited in claim 4:
said leg member having a baseplate fixed thereto at the bottom of the member;
an opening in said baseplate for receiving the shank of a headed fastener for fastening said leg member to a floor;
said end plate of the cover assembly having a lower tab attached to the inner side thereof and extending within the channel-shaped leg member adjacent said baseplate and above the latter;
and an opening in said lower tab for receiving the head of said fastener.

6. In a seat:
a seat frame;
a pedestal for supporting said seat frame;
and an assembly for covering said pedestal;
said pedestal comprising a pair of leg members and a crossmember extending between the leg members at the top thereof;
said crossmember having a web and downwardly depending flanges terminating at an open side;
said cover assembly including a channel-shaped cover portion having a web covering the open side of said crossmember and having upwardly extending flanges substantially covering the downwardly depending flanges of said crossmember;
said cover assembly comprising a top plate covering the web of the crossmember;
said top plate having a pair of downwardly depending marginal flanges each overlapping a respective upwardly extending flange on the channel-shaped cover portion.

7. In a seat as recited in claim 6:
each of said leg members having a web and a pair of flanges;
said cover assembly comprising a channel-shaped second cover portion extending downwardly from and attached to said first-recited cover portion;
said second cover portion having a web covering the web on one of said leg members and having flanges covering the flanges of said leg member;
said cover assembly comprising an end plate for closing the open side of said channel-shaped second cover portion;
said end plate having an upper tab located below said top plate and extending between the downwardly depending marginal flanges of the top plate;
and aligned openings in said top plate and said upper tab for receiving a fastener for attaching the end plate to the top plate.

8. In a seat as recited in claim 6:

a bracket attached to said seat frame and having a flat portion for resting atop said top plate of the pedestal cover assembly;

aligned openings in said flat portion, said top plate and said web of the crossmember for receiving a fastener for attaching the seat frame to the pedestal;

and a threaded nut attached to the bottom of the web of the crossmember in alignment with said aligned opening therein.

9. In a seat:

a seat frame;

a seat back mounted on said seat frame;

a rear cover panel for said seat;

means attaching said rear cover panel to said seat frame behind said seat back;

and closed recessed handgrab means in said rear cover panel adjacent an upper corner thereof;

said recessed handgrab means having an upper sidewall parallel to the closest portion on the top of the seat back, said upper sidewall and said top portion of the seat back defining a handle, said recessed handgrab means having an outer sidewall parallel to the closest portion on the side of the seat back, said outer sidewall and said side portion of the seat back defining a handle.

* * * * *